United States Patent [19]

Beaudoin

[11] Patent Number: 4,723,426
[45] Date of Patent: Feb. 9, 1988

[54] WHEEL CLAMP ATTACHMENT

[76] Inventor: Fernand Beaudoin, 915 Notre-Dame Street, Repentigny, Quebec, Canada

[21] Appl. No.: 941,438

[22] Filed: Dec. 15, 1986

[51] Int. Cl.⁴ ............................................. E05B 73/00
[52] U.S. Cl. ......................................... 70/14; 70/18; 70/19; 70/226
[58] Field of Search ....................... 70/14, 18, 19, 225, 70/226, 259

[56] References Cited

U.S. PATENT DOCUMENTS

| Re. 24,712 | 10/1959 | Marugg. | |
|---|---|---|---|
| 1,688,496 | 10/1928 | Holtzman | 70/226 |
| 2,844,954 | 7/1958 | Marugg. | |
| 2,960,857 | 11/1960 | Winter | 70/19 |
| 3,828,590 | 8/1974 | Triebault | 70/19 |
| 3,868,837 | 3/1975 | Quimby | 70/259 |
| 4,526,021 | 7/1985 | Princell | 70/259 |
| 4,651,849 | 3/1987 | Givati | 70/225 |

FOREIGN PATENT DOCUMENTS 2110175  6/1983  United Kingdom ..................... 70/14

*Primary Examiner*—Robert L. Wolfe
*Attorney, Agent, or Firm*—Nixon & Vanderhye

[57] ABSTRACT

A clamp attachment for preventing rotation of the wheel of a vehicle, such as an automobile or truck. Designed to be mounted on site, the attachment comprises two hingedly connected members adapted to engage the inner and outer faces of the wheel rim. A swivel bolt extends in both members. One end of the bolt is engageable with a wrench which is used to move the members relative to one another about the hinge axis. The wrench remains in engagement with the end of the swivel bolt when the attachment is in a clamp engagement with the vehicle wheel and serves as part of the locking mechanism.

13 Claims, 8 Drawing Figures

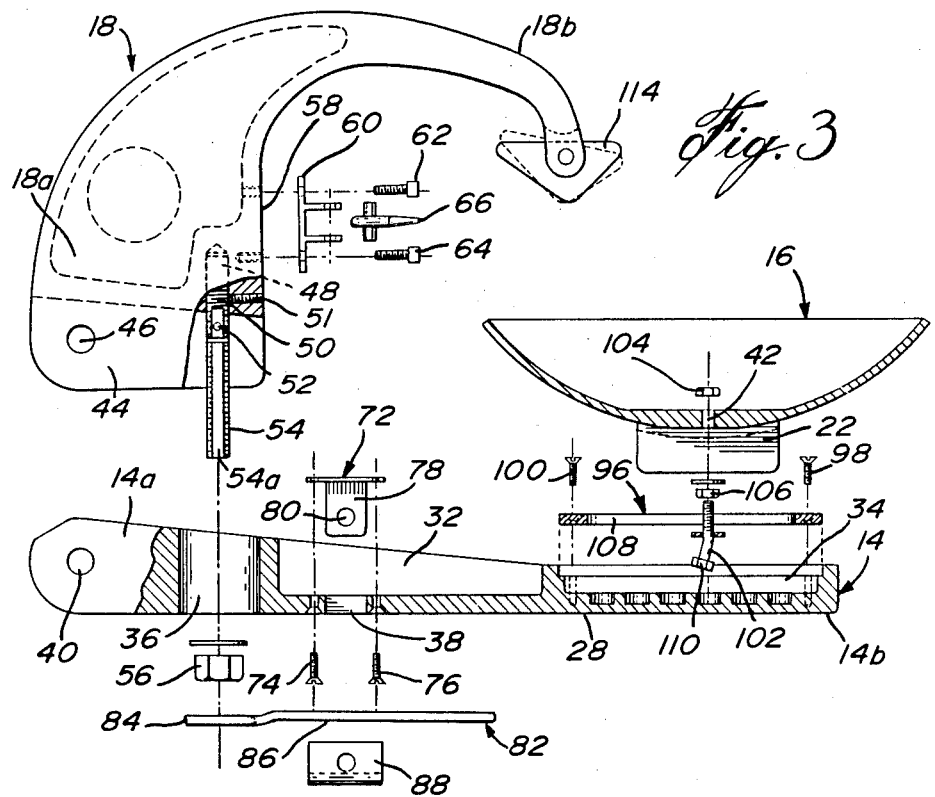
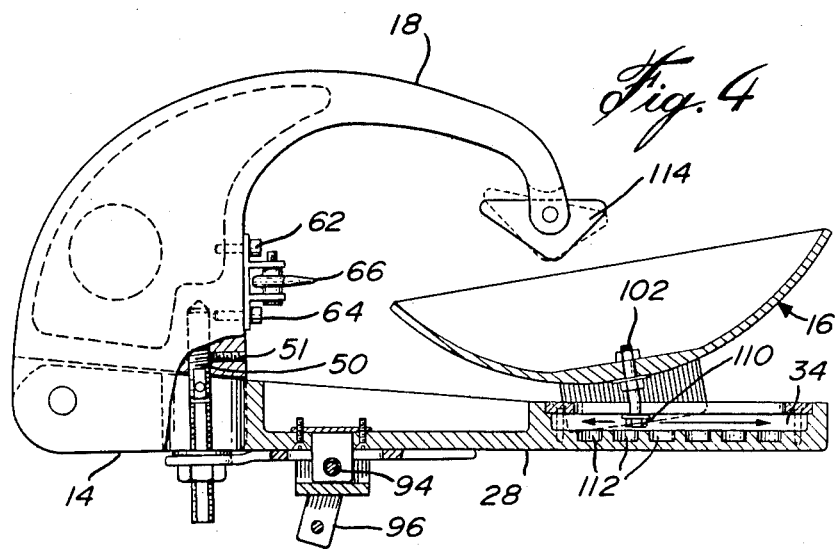

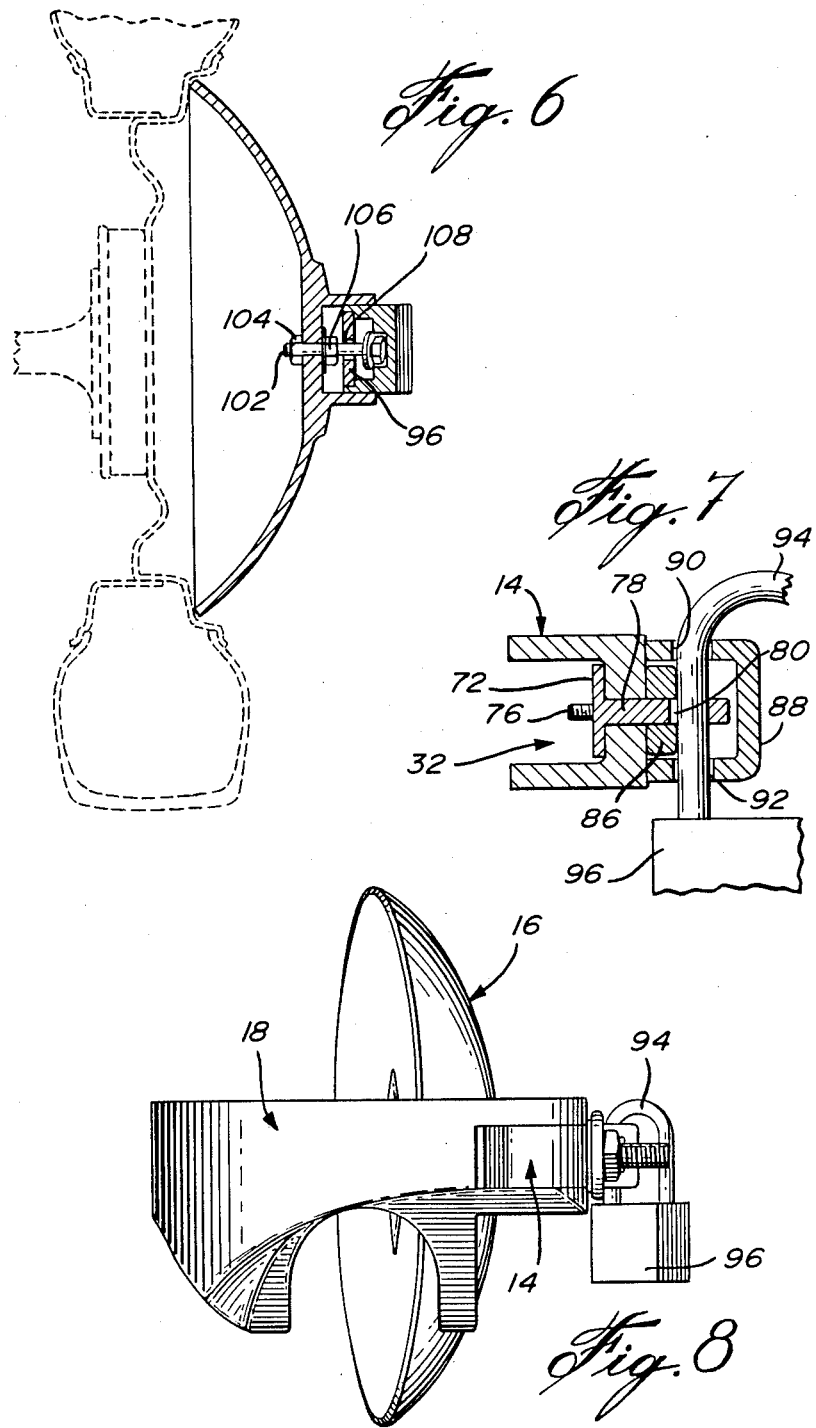

WHEEL CLAMP ATTACHMENT

FIELD OF THE INVENTION

The present invention pertains to an attachment to the wheel of a vehicle, such as an automobile or truck, by clamping the opposite faces of the wheel rim.

BACKGROUND OF THE INVENTION

It is common for operators of parking lots, officers of law or car owners to impound vehicles for various reasons such as non-payment of parking dues, law infractions or simply to prevent theft of the vehicle.

Many devices have been used for such a purpose; for example, one clamp designed to be placed and locked on wheels of vehicles may be found described in U.S Pat. No. 2,844,954 issued July 29, 1958 to Frank P. Marugg or its U.S. Pat. No. Re 24,712, dated Oct. 6, 1959. However, such clamp has various drawbacks. It comprises many parts causing delay in mounting and is difficult to install resulting in cumbersome manipulation of the various parts. Furthermore, it cannot be adjusted to be installed on all sizes of wheels.

OBJECTS AND STATEMENT OF THE INVENTION

It is an object of the present invention to provide a wheel clamp attachment which may be quickly installed and which overcomes the above-mentioned drawbacks of presently known devices.

The wheel clamp attachment of the present invention comprises: a first elongated member adapted to extend substantially parallel to the plane of the wheel; a second member adjustably mounted to one end of this first member and adapted to cover a major portion of the exterior face of the rim of the wheel; and a third member which is hingedly connected to the first member, the third member having a first portion adapted to surround the tread portion of the wheel tire and a second portion adapted to extend rearwardly of the wheel and to contact the inner side of the rim. The clamp attachment further includes means on the first and third members which will allow these members to be drawn towards one another to thereby cause engagement of the second portion of the third member with the inner side of the rim. Tool means are mounted to the first member for engaging and operating the drawing means. Also, locking means are provided on the first member for maintaining the tool means in engagement with the drawing means once the first and second members have been drawn together in a wheel clamping engagement.

In one form of the invention, the second member is in a shape of a dish which covers a major portion of the exterior face of the rim.

In a further embodiment of the invention, the dish-like member is longitudinally adjustable on the first member.

In a further embodiment of the invention, the attachment further includes pin means which will engage the tread of the tire if rotation of the wheel is initiated with possible puncture of the tire.

Other objects and scope of applicability of the present invention will become apparent from the following description of preferred forms of the invention.

BRIEF DESCRIPTION OF THE DRAWINGS

FIG. 3 is an exploded top, partly cross-sectional, view of the clamp attachment;

FIG. 4 is a top view similar to FIG. 3 showing the components in assembly;

FIG. 6 is a cross-sectional view taken along lines 6—6 of FIG. 2;

FIG. 7 is a cross-sectional view taken along lines 7—7 of FIG. 2; and

FIG. 8 is a front elevation view of the clamp attachment.

DESCRIPTION OF PREFERRED EMBODIMENTS

Figure 1:
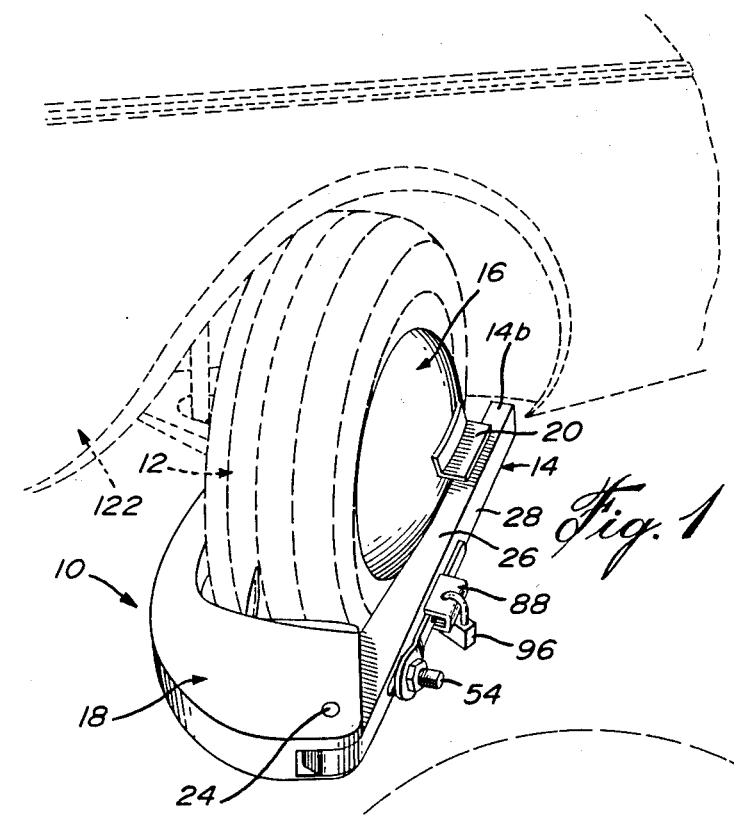
FIG. 1 is a perspective view of a clamp attachment made in accordance with the present invention shown mounted to a vehicle wheel.
Figure 2:
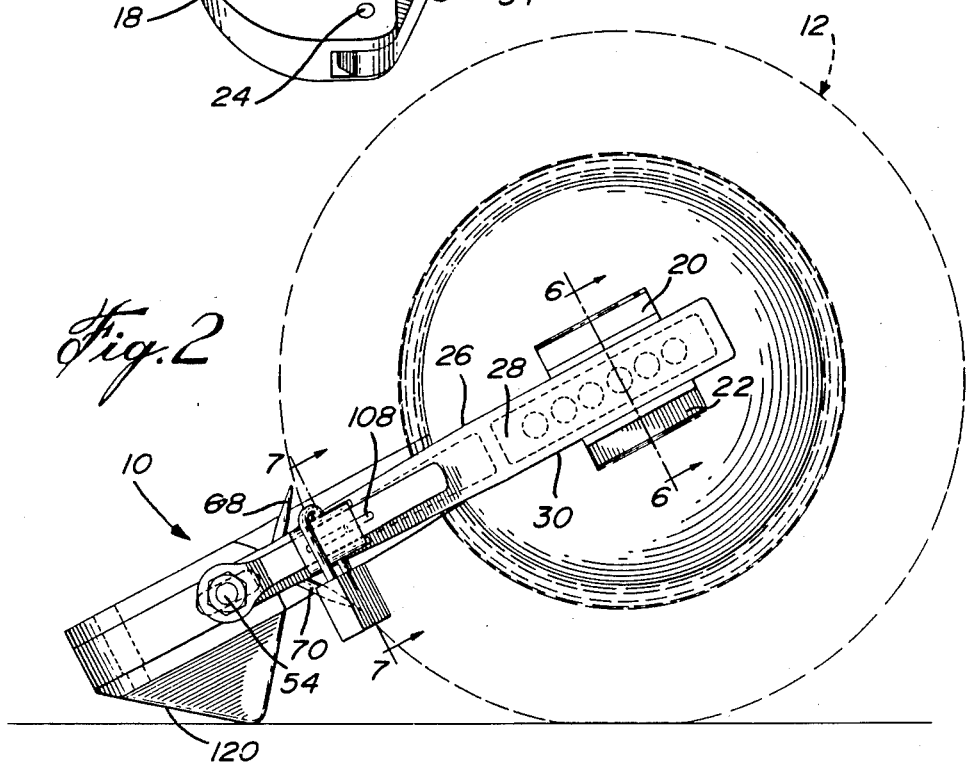
FIG. 2 is a side elevational view of the clamp attachment shown in FIG. 1.

As it can be seen in FIGS. 1 and 2, the clamp attachment of the present invention, generally designated 10, is adapted to be mounted to a vehicle wheel, generally denoted 12.

The attachment 10 comprises three main members 14, 16 and 18 (referred hereinbelow as first, second and third members respectively). The second member 16 is in the shape of a dish which covers a major portion of the external face of the wheel. A pair of L-shaped guide plates are integrally formed to the outer face of the dish member and separated from one another to allow insertion therebetween of the end portion 14b of the first member. A hole 42 extends at the center of member 16. The third member 18 is hingedly connected to the first member 14 by means of a pin 24 extending through both members.

Referring also to FIG. 3, the first member 14 consists of an elongated narrow rectangular body that includes planar top, front and bottom walls 26, 28 and 30. Member 14 has a rear wall provided with cavities 32 and 34, the function of which will be described further hereinbelow. Member 14 also includes two rectangular slotted openings 36 and 38, the latter terminating in cavity 32. Also, a bore 40 extends transversely to receive pin 24.

The third member 18 has an arcuate shape with a first portion 18a which distancedly faces the tread of the wheel tire and a second portion 18b which is narrow and extends rearwardly of the wheel 12. Portion 18a has a yoke-like configuration 44 at one end thereof in order to receive therewithin the end 14a of the first member. The yoke 44 displays a hole 46 adapted to come in registry with the hole 40 of the first member in order to receive the pin 24 therein. Portion 18a also includes a threaded cavity 48 into which is engaged a first part 50 of a swivel bolt having a swivel axis 52 and a second part 54, the latter extending through the slotted opening 36 of the first member. A locking pin 51 secures the first part 50 in the cavity 48 once threadedly received in the cavity. The bolt part 54 has opposite planar non-threaded faces 54a which are in facing arrangement with the opposite inner side walls of the rectangular slotted opening 36. The distance between the faces 54a and the walls of opening 36 is such as to prevent the bolt from rotating in the slotted opening. The lower end of the bolt part 54 protrudes the opening 36 to receive a nut 56.

To the inner face 58 of section 18a of the third member is mounted a bracket 60 by means of a pair of screws 62 and 64; this bracket serves to pivotally support a double-pin element 66 consisting of a pair of pointed legs 68 and 70 having rounded extremities.

A lug 72 is secured in cavity 32 by means of a pair of screws 74, 76; the lug displays a tongue portion 78 having a circular opening 80 and extending through the rectangular opening 38 when the lug is assembled to member 14.

A tool device 82, in the form of a wrench, has a head 84 with a nut engaging orifice having a configuration corresponding to the contour of nut 56 and a handle portion 86 with a rectangular shaped opening 80 (see FIG. 7) so as to allow passage of tongue 78 of lug 72 therethrough.

The clamp assembly also comprises a U-shaped cover element 88, the upper and lower sides of which include aligned openings 90 and 92 (see FIG. 7). It comprises further a padlock 96 with an inverted U-shaped rod portion 94 which passes through both openings 90 and 92.

Referring more particularly to FIGS. 3-6, the dish-like member 16 is longitudinally adjustable on the elongated member 14. Cavity 34 is formed into a chamber with the presence of plate 96 which is secured to the rear wall of member 14 by means of screws 98, 100. A bolt 102 has an angled threaded portion extending through opening 42 of member 16 and secured to the latter by a pair of nuts 104, 106. Plate 96 has a longitudinal slot 108 allowing bolt 92 to be longitudinally displaced therein. The head 110 of the bolt is received in any one of a series of horizontally spaced recesses 112 formed in the chamber 34 and having a shape corresponding to that of the bolt head 110.

Arm portion 18b of the third member 18 has a triangular-shaped abutment 114 which is pivotally mounted thereto and which is adapted to bear against the wheel rim 116 and the wheel drum 118.

Figure 5:
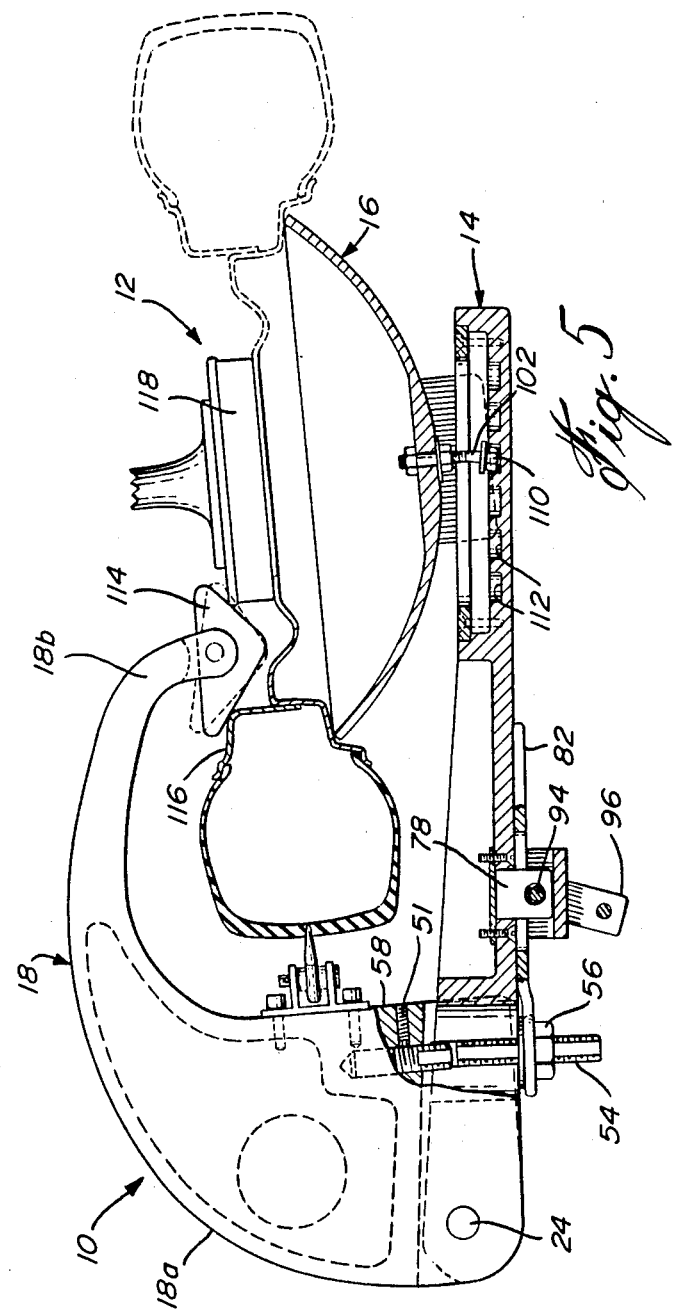
FIG. 5 is a top view similar to FIG. 4 showing the clamp attachment in engagement with a wheel.

The installation of the clamp attachment of the present invention will now be described with reference to FIGS. 5 and 6. The attachment 10 is placed about a wheel with the third member 18 placed at the rear thereof. The attachment is then pulled forward so that the abutment 114 is forced to bear against the rim and the drum as shown. The attachment is then moved to pivot about the pivot axis of the abutment 114 until the pin means 68, 70 rest against the tread of the tire. Thereafter, the first member 14 is moved to adopt a position which is substantially parallel to the plane of the wheel. The dish-like element 16 is then adjusted so that it may face the rim portion of the wheel. The exact positioning of the dish-like member 16 over the rim as well as of the wall 58 of the section 18a relative to the wheel tire is accomplished by appropriately locating the head 110 of bolt 102 in the proper recess 112. Then, wrench 82 is used, engaging nut 56 to secure a tight clamping engagement of the attachment 10 on the wheel 12. This tightening procedure simultaneously ensures that head 110 of bolt 102 is properly secured in its proper recess 112. Once a tight clamping is obtained, the wrench is maintained in engagement with the nut 56, but positioned in the manner such as illustrated in FIG. 2 and 7 with tongue 78 of plug 72 extending through slot 108. Cover 88 is then positioned over the protruding portion of tongue 78 and the rod 94 member of the padlock 96 is then inserted in the aligned holes of the tongue and cover to lock the wrench in position on member 14. As illustrated in FIG. 2, forward motion of the wheel is prevented by the lower abutment 120 on the ground while rearward rotation will be prevented by the attachment contacting the fender 122 of the vehicle.

As an additional means of refraining movement of the wheel, the two pointed legs 68 and 70 of the attachment will forcingly engage the tire with possible puncture.

Although this invention has been described in relation to one specific form, it will be evident to the person skilled in the art that it may be refined and modified in various ways. Therefore, it is wished to have it understood that the present invention should not be limited in interpretation except by the terms of the following claims.

The embodiments of the invention in which an exclusive property or privilege is claimed are defined as follows:

1. A wheel clamp attachment for preventing rotation of a vehicle wheel consisting of a tire and a drum-mounted rim, said rim having an inner side and an outer face, comprising:
   a first elongated member adapted to extend substantially parallel to the plane of the wheel;
   a second member adjustably mounted adjacent to one end of said first member and adapted to overlie and engage a major portion of the outer face of the wheel rim on opposite sides of the axis of the wheel;
   a third member hingedly connected, at one end thereof, to an opposite end of said first member, said third member having a first portion adapted to surround a tread portion of said tire and a second portion adapted to extend rearwardly of said wheel and to contact the inner side of the rim short of the axis of the wheel;
   means on said first and third members for drawing said first and third members toward one another to thereby cause contact of said second portion of said third member on the inner side of said rim with said second member in covering engagement with the outer face of said rim;
   tool means mounted to said first member for engaging and operating said drawing means; and
   locking means on said first member for maintaining said tool means in engagement with said drawing means once the first and third members have been drawn together to clamp the wheel.

2. A wheel clamp as defined in claim 1, wherein said second member is a dish-like element adapted to cover a major portion of the outer face of said rim.

3. A wheel clamp as defined in claim 1, further comprising means for adjusting longitudinally said second member on said first member.

4. A wheel clamp as defined in claim 1, wherein said drawing means include swivel bolt means having a first threaded part engaging said first member and a second threaded part engaging said third member, said first and second parts being pivotally connected to one another and being operative by said tool means to cause relative movement between said first and third members.

5. A wheel clamp as defined in claim 4, wherein said tool means consists of a wrench having a head adapted to engage a corresponding shaped nut threadedly mounted on said first part.

6. A wheel clamp as defined in claim 5, said first member having a first slotted opening to receive said first threaded part of said swivel bolt means; said opening being such as to prevent rotation of said first threaded part therein.

7. A wheel clamp as defined in claim 6, said first member including a second slotted opening; said wrench having a slot in a handle portion thereof; said locking means including lug means secured to said first member and having a portion protruding said slot and said slotted opening; and a lock engaging said protruding portion to prevent removal of said wrench from said first member.

8. A wheel clamp as defined in claim 1, further comprising abutment means pivotally mounted at the opposite end of said third member for engaging the inner side of the rim and the wheel drum.

9. A wheel clamp as defined in claim 1, said first portion of said third member including pin means pivotally mounted to a side wall thereof to engage the tread portion of said tire.

10. A wheel clamp as defined in claim 3, wherein said means for adjusting longitudinally said second member on said first member comprise bolt means having a head engaged in said first member and an opposite threaded portion engaged in said second member.

11. A wheel clamp attachment for preventing rotation of a vehicle wheel consisting of a tire and a drum-mounted rim, said rim having an inner side and an outer face, comprising:
  a first elongated member adapted to extend substantially parallel to the plane of the wheel;
  a second member adjustably mounted adjacent to one end of said first member and adapted to cover a major portion of the outer face of the wheel rim;
  a third member hingedly connected, at one end thereof, to an opposite end of said first member, said third member having a first portion adapted to surround a tread portion of said tire and a second portion adapted to extend rearwardly of said wheel and to contact the inner side of the rim;
  means on said first and third members for drawing said first and third members towards one another to thereby cause contact of said second portion of said third member on the inner side of said rim with said second member in covering engagement with the outer face of said rim;
  tool means mounted to said first member for engaging and operating said drawing means;
  locking means on said first member for maintaining said tool means in engagement with said drawing means once the first and third members have been drawn together to clamp the wheel;
  means for adjusting longitudinally said second member on said first member comprising bolt means having a head engaged in said first member and an opposite threaded portion engaged in said second member, said head of said bolt means being received in a chamber defined in said first member; said chamber having a series of recesses therein shaped to receive said head therein.

12. A wheel clamp as defined in claim 11, wherein said bolt means include an angled stem portion.

13. A wheel clamp attachment for preventing rotation of a vehicle wheel consisting of a tire and a drum-mounted rim, said rim having an inner side and an outer face, comprising:
  a first elongated member adapted to extend substantially parallel to the plane of the wheel;
  a second member adjustably mounted adjacent to one end of said first member and adapted to cover a major portion of the outer face of the wheel rim; and
  a third member hingedly connected, at one end thereof, to an opposite end of said first member, said third member having a first portion adapted to surround a tread portion of said tire and a second portion adapted to extend therefrom toward the axis of said wheel and to contact the inner side of the rim;
  means cooperable between said first member and the first portion of said third member and located inwardly of said hinged connection toward said axis for drawing said first and third members toward one another to cause contact of the second portion of the third member on the inner side of the rim with said second member in engagement with the outer face of the rim, said drawing means including a swivel connection between said first and third members to enable said first and third members to be drawn toward one another.

* * * * *